No. 674,022. Patented May 14, 1901.
F. A. SEIBERLING.
VEHICLE TIRE.
(Application filed Sept. 24, 1900.)
(No Model.)

Witnesses:
Anna S. Lu.
M. W. Wade

Inventor:
Frank A. Seiberling,
by Humphrey & Humphrey,
Attorneys.

UNITED STATES PATENT OFFICE.

FRANK A. SEIBERLING, OF AKRON, OHIO.

VEHICLE-TIRE.

SPECIFICATION forming part of Letters Patent No. 674,022, dated May 14, 1901.

Application filed September 24, 1900. Serial No. 30,925. (No model.)

*To all whom it may concern:*

Be it known that I, FRANK A. SEIBERLING, a citizen of the United States, residing at Akron, in the county of Summit and State of Ohio, have invented a certain new and useful Improvement in Vehicle-Tires, of which the following is a specification.

My invention has relation to improvements in that class of vehicle-tires in which the wood felly is surrounded by a metal tire on which is secured an outside tire of flexible vulcanized rubber, having embedded longitudinal wires to bind the rubber against escape. Heretofore in the construction of tires of this class it has been customary to form the metallic tire with a channel in its outer face and to form the rubber portion in a strip and to strain it and its embedded wires about and within this channel-tire and while held in tension to unite the ends of the wires and afterward the ends of the rubber tire. This construction, while measurably satisfactory, is objectionable in many features, the most prominent of which are that the rubber when vulcanized in a straight form is not perfectly homogeneous when drawn about a wheel, the inner portion being more dense than the outer or tread portion. The straining of the wires and rubber to effect a secure setting of the tire necessitates intricate and costly machinery and very considerable expense of time and labor, and when completed there is always the joint that is an ever-present element of weakness, liable to separate at any time.

The objects of my invention are to overcome these objections by making the rubber tire endless at the outset, embedding endless wires therein, using a plain strap metallic tire instead of a channeled one, and securing the rubber tire and the metallic tire together and to the felly by means of annular side plates fastened by bolts or rivets passing transversely through both the rubber tire and the wood felly.

To the aforesaid objects my invention consists in the peculiar and novel arrangement, construction, and combination of parts hereinafter described and then specifically pointed out in the claims, reference being had to the accompanying drawings, forming a part of this specification.

Figure 1:
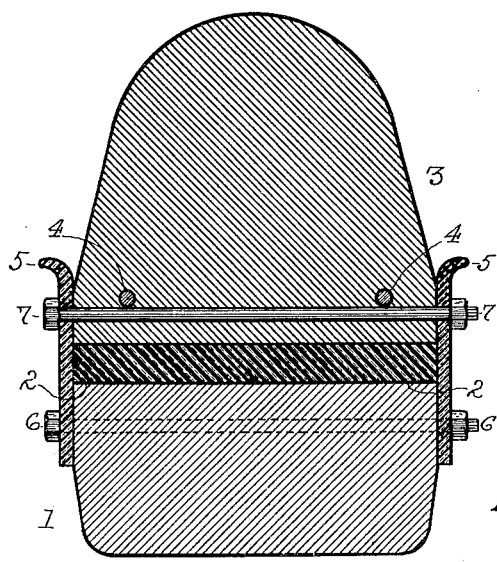
Figure 2:
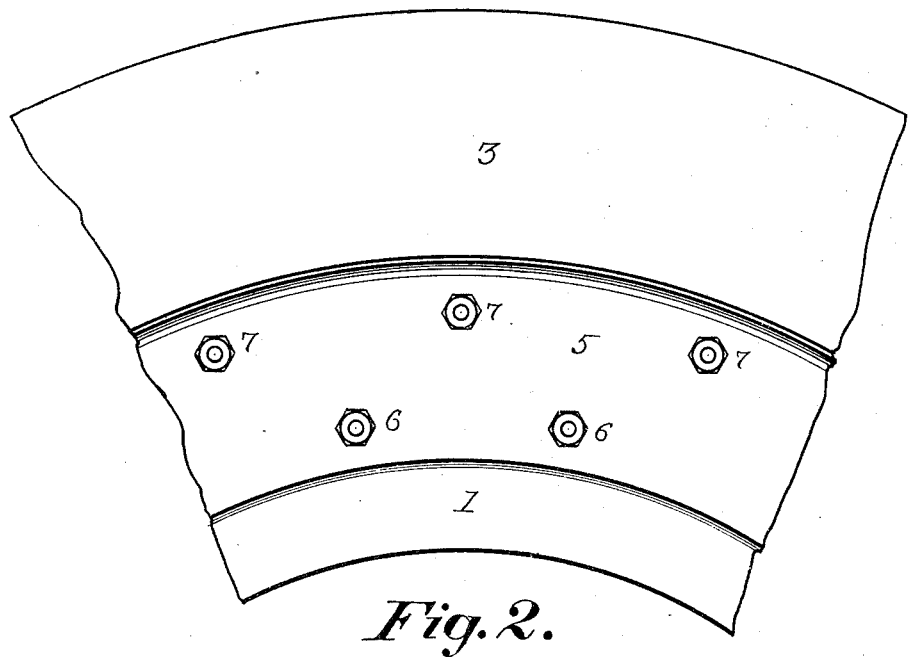

In the accompanying drawings, in which similar reference-numerals indicate like parts in the different views, Figure 1 is a transverse section of a wheel-felly, metallic tire, rubber tire, and side plates embodying my invention; and Fig. 2, a side elevation of a portion of the same.

Referring to the figures, 1 is the wheel-felly, and 2 the metal tire. About and resting on this metal tire is a solid-rubber tire 3 of substantially the usual type in cross-section, with a flat base, substantially straight sides for a short distance, thence sloping inward, and curved at the top or tread portion. This rubber portion 3 is made and vulcanized annular or endless, with two endless parallel wires embedded therein. In constructing this portion it is made of such internal size as will require a slight pressure to force it from one side onto the iron tire, which it will press with a considerable tension force. When the rubber portion has been placed on the metal tire, annular plates 5, with the outer periphery curved outward and of sufficient width to cover the outer portion of the felly, the iron tire, and the substantially flat portion of the rubber and to extend slightly above the corner where the sloping part commences, are placed on opposite sides of the wheel and secured to the felly by bolts 6, passing therethrough at intervals about the wheel. Similar bolts 7 pass through the plates 5 and rubber tire 3 and preferably touching the wires and being so placed as to be intermediate of the bolts 6. By this arrangement the tire is securely fastened in place, its structure is homogeneous, and hence its durability is increased over those where the rubber is strained, it requires no expensive machinery to set it, and when it needs renewal it can be easily and quickly removed.

I claim as my invention—

1. The combination in a wheel of a felly, a flat metallic tire, an endless rubber tire surrounding and resting on the metal tire, and having parallel endless wires embedded therein, with oppositely-disposed annular plates arranged to cover adjacent parts of the felly and rubber tire, and two series of bolts one whereof pass through the plates and felly at intervals, and the other through the plates and rubber at alternate intervals, substantially as shown and described.

2. The combination in a wheel of a felly, a flat metallic tire, an endless rubber tire surrounding and resting on the metal tire, having endless wires embedded therein, oppositely-disposed annular plates having their outer peripheries curved outward adapted to cover adjacent parts of the felly and rubber tire, and a series of bolts to secure the plates together and to said felly, and a second series passing through said plates and rubber contiguous to and inside of the parallel wires, substantially as shown and described.

In testimony that I claim the above I hereunto set my hand in the presence of two subscribing witnesses.

FRANK A. SEIBERLING.

In presence of—
C. P. HUMPHREY,
C. E. HUMPHREY.